(12) United States Patent
Hayakawa (10) Patent No.: US 6,820,031 B1
(45) Date of Patent: Nov. 16, 2004

(54) METHOD AND DEVICE FOR DISTANCE DETECTION

(75) Inventor: Tadashi Hayakawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 353 days.

(21) Appl. No.: 10/019,270

(22) PCT Filed: Jul. 26, 2000

(86) PCT No.: PCT/JP00/04971

§ 371 (c)(1),
(2), (4) Date: Jan. 3, 2002

(87) PCT Pub. No.: WO01/07932

PCT Pub. Date: Feb. 1, 2001

(30) Foreign Application Priority Data

Jul. 26, 1999 (JP) ............................................ 11-210237

(51) Int. Cl.[7] ........................ G01D 18/00; G01D 21/00; G01M 19/00; G01P 21/00; G01R 35/00
(52) U.S. Cl. .................... 702/158; 702/107; 340/573.1; 340/870.05; 340/870.01; 370/353; 235/472.01; 235/462.45; 104/88.04; 600/445; 73/488; 73/623
(58) Field of Search ................................ 702/107, 158; 340/573.1, 870, 870.05, 870.01; 370/353; 235/472.01, 462.45; 104/88.04; 600/445; 73/488, 623

(56) References Cited

U.S. PATENT DOCUMENTS 4,276,549 A   6/1981   Tomasi 5,959,568 A * 9/1999 Woolley ........................ 342/42
6,539,336 B1 * 3/2003 Vock et al. .................. 702/182

FOREIGN PATENT DOCUMENTS

| EP | 865223 | 9/1998 |
|----|--------|--------|
| JP | 58140661 | 8/1983 |
| JP | 5-122120 | 5/1993 |
| JP | 7-43456 | 2/1995 |
| JP | 8-327730 | 12/1996 |
| JP | 9-318735 | 12/1997 |
| JP | 10322752 | 12/1998 |
| JP | 11094933 | 4/1999 |

OTHER PUBLICATIONS

English Language Abstract of JP-7-43456.
English Language Abstract of JP-10-322752.
English Language Abstract of JP-11-094933.
English Language Abstract of JP-8-327730.
English Language Abstract of JP-58-140661.
English Language Abstract of JP-5-122120.
English Language Abstract of JP-9-318735.

* cited by examiner

*Primary Examiner*—Bryan Bui
*Assistant Examiner*—Aditya Bhat
(74) *Attorney, Agent, or Firm*—Greenblum & Bernstein, P.L.C.

(57) ABSTRACT

A distance detection apparatus cancels signal delay times of transmission and reception circuits (13, 15, 22, 25), which are causes of the errors of distance detection, by receiving a transmission signal turned back directly to measure the difference between the transmission timing and the reception timing at that time, and by setting the value obtained by the measurement as a correction value at the time of obtaining the measurement distance.

7 Claims, 3 Drawing Sheets

METHOD AND DEVICE FOR DISTANCE DETECTION

TECHNICAL FIELD

The present invention relates to a distance detection apparatus and a method therefor, both suitable for detecting a relative distance between mobile stations or a relative distance between a mobile station and a base station. In particular, the present invention relates to a distance detection apparatus and a method therefor, both suitably applicable to a mobile communication system in conformity with the spectrum spreading communication mode.

BACKGROUND ART

Conventionally, there has been developed a distance detection apparatus for detecting a relative distance between two mobiles by means of the communication conforming to the spectrum spreading communication mode. For example, in the vehicle communication apparatus disclosed in Japanese Laid-Open Publication No. HEI 5-122120, when a certain communication station MS-1 transmitted a radio wave modulated in conformity with the spreading modulation to another communication station MS-2 and the communication station MS-2 received the transmitted wave, the communication station MS-2 transmits a radio wave modulated in conformity with the spreading modulation by the use of a spreading code synchronized with the spreading code of the received wave back to the communication station MS-1.

When the communication station MS-1 received the responded wave from the communication station MS-2, the communication station MS-1 detects the period of time from the transmission of the radio wave to the reception of the responded wave from the communication station MS-2, and detects the relative distance between the communication station MS-1 and the communication station MS-2 on the basis of the following formula (1).

$$\text{Relative Distance} = (\text{Light velocity}) \times (\text{Time Difference})/2 \qquad (1)$$

However, the aforesaid vehicle communication apparatus has a problem that it cannot perform the distance detection with high accuracy owing to signal delays in the transmission circuits thereof and the reception circuits thereof.

DISCLOSURE OF INVENTION

The present invention was invented in consideration of the problem, and aims to provide a method for detecting distance and a distance detection apparatus, both capable of removing the errors of distance detection caused by signal delays in the transmission circuits thereof and the reception circuits thereof.

A method for detecting a distance according to the present invention is a method for detecting a distance by measuring the propagation time of an electromagnetic wave, and the method inputs a transmission signal output from a transmission system circuit directly into a reception system circuit, and obtains the signal delay time of the transmission and reception circuit by measuring a difference between the reception timing of the transmission signal that has passed through the reception system circuit and the transmission timing of the transmission signal, and then performs the correction of the measured distance by using the obtained signal delay time.

According to the method, the sum of the signal delay time of the transmission system circuit and the signal delay time of the reception system circuit are measured, and the measured sum of the signal delay times is used as a correction value at the time of obtaining a measurement distance. Consequently, respective signal delay times of the transmission system circuit and the reception system circuit are canceled. Thereby, distance detection with high accuracy becomes possible.

Moreover, a method for detecting a distance according to the present invention receives a reflection signal of a transmission signal from an object of distance measurement, and measures the phase difference between the reception signal and the transmission signal, and detects the relative distance to the object of distance measurement on the basis of the measurement result, and further corrects the detected relative distance by means of the signal delay time in a transmission and reception circuit, the signal delay time being a measurement result of the difference between the reception timing of the transmission signal in the reception system circuit and the transmission timing of the transmission signal.

According to the method, the sum of the signal delay time of the transmission system circuit and the signal delay time of the reception system circuit is measured, and the measured sum of the signal delay times is used as a correction value at the time of obtaining a measurement distance to the object of distance measurement. Consequently, respective signal delay times of the transmission system circuit and the reception system circuit are canceled. Thereby, distance detection with high accuracy becomes possible.

Moreover, a distance detection apparatus according to the present invention adopts a configuration comprising: a transmission system circuit in which a timer of a self station generates a periodic signal that is transmitted to an opponent station; a reception system circuit for receiving a periodic signal generated by a timer of the opponent station and transmitted to the self station; a signal path for inputting the transmission signal from the transmission system circuit to the reception system circuit directly; and a distance detection section for measuring a difference between the transmission timing at the time of the transmission of the signal from the transmission system circuit and the reception timing at the time of the input of transmission signal to the reception system circuit through the signal path to obtain a self station signal delay time, and for measuring a quantity of discrepancy between a reception timing of the transmission signal from the opponent station and the reference timing of the timer of the self station to obtain a self station detection phase difference, and for detecting a relative distance between the self station and the opponent station by the use of the self station signal delay time, the self station detection phase difference, the opponent station signal delay time obtained by the opponent station, and the opponent station detection phase difference.

According to the configuration, by the measurement of the respective sums of the signal delay times of the transmission system circuits and the signal delay times of the reception system circuits of the two communication stations, and by the use of the respective sums of the signal delay times as correction values at the time of the obtainment of a relative distance between the two communication stations, signal delay times of the respective transmission system circuits and the respective reception system circuits of the two communication stations are canceled, and then distance detection with high accuracy becomes possible.

BEST MODE FOR CARRYING OUT THE INVENTION

Hereinafter, embodiments of the present invention will be described by reference to the attached drawings.

(Embodiment 1)

Figure 1:
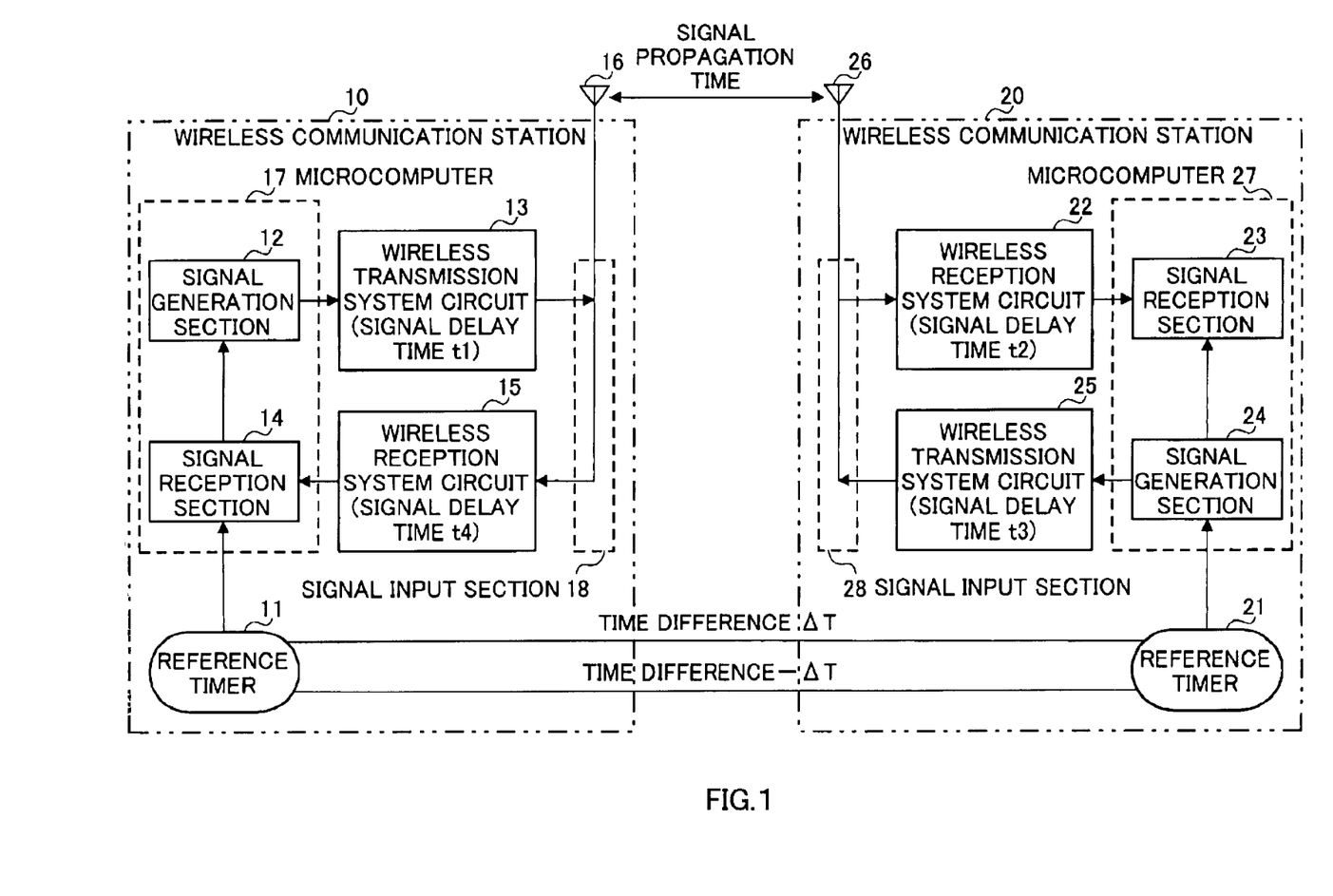
FIG. 1 is a block diagram showing the basic configuration of the distance detection apparatus according to embodiment 1 of the present invention.

FIG. 1 is a block diagram showing the basic configuration of the distance detection apparatus according to the embodiment 1 of the present invention. In the figure, the distance detection apparatus according to the embodiment 1 are severally mounted on communication stations 10, 20 for transmitting signals and receiving them by means of electric waves. The communication stations 10, 26 includes reference timers 11, 21, signal generation sections 12, 24, transmission system circuits 13, 25, signal reception sections 14, 23, reception system circuits 15, 22 and antennas 16, 26 for both of transmitting and receiving.

In the distance detection apparatus according to the embodiment 1, the signal generation section 12 and the signal reception section 14 in the communication station 10 on one side and the signal reception section 23 and the signal generation section 24 in the communication station 20 on the other side are embodied as microcomputers 17, 27 respectively.

In not shown memories mounted on the microcomputers 17, 27 are written programmed data of a distance detection method (distance detection program), which will be described in the following. Incidentally, it is preferable to use a magnetic recording medium such as a hard disk apparatus, a floppy disk, CD-ROM, CD-RW, and MO, an optical recording medium and an optical magnetic recording medium besides the aforesaid memory as a recording medium for storing the distance detection program.

A signal line 18 (28) connecting between the antenna 16 (26) for both of transmitting and receiving and the transmission system circuit 13 (25) or the reception system circuit 15 (22) corresponds to signal input means. The reference numerals inserted in the parentheses indicate the constituent elements on the communication station 20 side.

Incidentally, it is supposed that the period of the reference timer 11 and the period of the other reference timer 21 are the same. It is also supposed that the time difference ΔT shown in FIG. 1 becomes >0 (positive) when the time of the reference timer 21 of the other communication station 20 is earlier than the time of the reference timer 11 of the one side communication station 10, and becomes <0 (negative) when the former is later than the latter. Moreover, the following description will be given on the supposition that the timer of the other side reference timer 21 is earlier than the time of the one side reference timer 11.

Now, the one side communication station 10 transmits a signal having a period synchronized with the reference timing based on the reference timer 11 (periodic signal) to the other side communication station 20. For simplifying the description, the transmission timing is supposed to be the initial phase of the reference timer 11. When the other side communication station 20 receives the periodic signal transmitted from the one side communication station 10, the other side communication station 20 transmits a periodic signal synchronized with the reference timing based on the reference timer 21 in the communication station 20 to the one side communication station 10. For simplifying the description, the transmission timing of the other side communication station 20 is supposed to be the initial phase of the reference timer 21. Then, the one side communication station 10 receives the periodic signal transmitted from the other side communication station 20 to detect the phase difference between the received periodic signal and the previously transmitted periodic signal, and then the communication station 10 corrects the signal delay time of the self station, which will be described later, on the basis of the detected phase difference. A distance is calculated by the use of the correction value.

The other side communication station 20 also detects, similarly, the phase difference on the basis of the transmission timing to the one side communication station 10 and the reception timing, and further measures the signal delay time in the communication station 20. And then, the communication station 20 transmits the phase difference and the signal delay time detected by the communication station 20 or the correction value of the signal delay time corrected on the basis of the phase difference to the one side communication station 10. As will be described later, after the timer correction has been performed in a communication station, the distance calculation becomes possible without receiving the correction value of the opponent station.

Although the transmission timing of the transmission signals of the communication stations 10, 20 is supposed to be the initial phases of respective reference timers 11, 21 for the simplification of the description, the transmission timing is not necessarily the initial phase as long as the communication stations 10, 20 transmit the transmission timing at the same phase.

The case described above is the case where the one side communication station 10 is a station that performs the distance measurement. In the case where the other side communication station 20 is a station that performs the distance measurement, the transmission station and the reception station are exchanged.

Incidentally, although the description will hereinafter be given for the simplification of the description to a case where the one side communication station 10 transmits a transmission signal to the other side communication station 20 for the measurement of a distance and the other side communication station 20 that received the transmission signal transmits the transmission signal for the measurement of the distance back to the one side communication station 10 by the use of the transmission signal as a trigger, the present invention is not restricted to such a case. That is, when both of the communication stations 10, 20 are communicating about a thing unrelated to the measurement of distance, both the communication stations 10, 20 can severally perform the measurement of distance by utilizing transmission signals and reception signals in the communication. When an opponent station transmits a signal delay time in the transmission and reception circuit of the opponent station and correction information calculated by using the signal delay time, it is considerable to use the information by extracting from the reception signal.

Moreover, when the one side communication station 10 detects the distance between the communication station 10 and the other side communication station 20, the communication station 10 measures a signal delay time of the transmission and reception circuit (the transmission system circuit 13 and the reception system circuit 15), which causes errors, in the one side communication station. That is, the communication station 10 measures the difference between the transmission timing and the reception timing by turning back the transmission signal at a signal line 18 to receive the tuned back transmission signal. The communication station 10 corrects the distance measurement value with the measured value to cancel the signal delay time at the transmission and reception circuit, and consequently high accuracy distance detection become possible. Incidentally, in the case where the other side communication station 20 is a station that performs the distance measurement, the other side communication station 20 measures the signal delay time of the transmission and reception system circuit (the reception system circuit 22 and the transmission system circuit 25) in the communication station 20 to use the measured signal delay time as a correction value.

Hereinafter, the distance detection method will be described.

Here, the signal delay time of the transmission system circuit 13 in the communication station 10 is supposed to be t1; the signal delay time of the reception system circuit 15 is supposed to be t4; the signal delay time of the reception system circuit 22 in the communication station 20 is supposed to be t2; and the signal delay time of the transmission system circuit 25 is supposed to be t3.

The communication stations 10, 20 severally transmit a signal for distance measurement to an opponent station on the basis of the reference timers 11, 21 of the self station, and receive a signal for distance measurement from the opponent station to measure phase differences Ta, Tb between the signal transmitted from the self station and the signal transmitted from the opponent station.

Moreover, respective communication stations 10, 20 turn back transmission signals from the self stations at the signal lines 18, 28, and input the turned back transmission signals to the reception system circuits 15, 22 of the self stations to receive them. And then, the communication stations 10, 20 measure the differences between the transmission timing and the reception timing at that time. The values of t1, t2, t3 and t4 cannot be measured separately in the measurements. However, the communication station 10 can measure the value of (t1+t4), and the communication station 20 can measure the value of (t2+t3). In this case, the value of (t1+t4) is a sum of respective signal delay times of the transmission system circuit 13 and the reception system circuit 15 in the communication station 10, and the value of (t2+t3) is a sum of respective signal delay times of the transmission system circuit 25 and the reception system circuit 22 in the communication station 20.

As apparent from FIG. 1, the relationships between the phase differences Tb, Ta, a signal propagation time T, the time differences $\Delta T$, and the signal delay times t1, t2, t3, t4 meet the following formulae (2), (3).

$$Ta=T+t3+t4-\Delta T \quad (2)$$

$$Tb=T+t1+t2+\Delta T \quad (3)$$

The communication stations 10, 20 perform the corrections of the phase differences Ta, Tb in conformity with the following formulae (4), (5) by the use of signal delay times (t1+t4), (t2+t3), and transmit the corrected phase differences Tah, Tbh to the opponent stations.

$$Tah=Ta-(t1+t4) \quad (4)$$

$$Tbh=Tb-(t2+t3) \quad (5)$$

When the signal delay times t1, t4, t2 and t3 are supposed to be zero, the relative distance R between the communication stations can be detected by the following formula (6).

$$R=c\times T=c\times(Ta+Tb)/2 \quad (6)$$

Where "c" indicates light velocity.

Because the signal delay times t1, t4, t2, and t3 are actually not zero, the Ta and Tb on the right side of the formula (6) are replaced by the Tah, Tbh, and then the formulae (4), (5) are substituted to obtain the following formula (7). Moreover, when the formulae (2), (3) are substituted, the following formula (8) is obtained.

$$c\times(Tah+Tbh)/2=c\times\{Ta+Tb-(t1+t2+t3+t4)\}/2 \quad (7)$$

$$c\times(Tah+Tbh)/2=c\times T \quad (8)$$

The formula (8) is nothing else but the following formula (9) that is the formula (6) in which the Ta, Tb are substituted by the Tah, Tbh. Consequently, the relative distance R can be obtained in conformity with the formula (9).

$$R=c\times T=c\times(Tah+Tbh)/2 \quad (9)$$

On the other hand, the discrepancy quantity $\Delta Tb$ ($=-\Delta T$) of the reference timer 21 in the other side communication station 20 from the reference timer 11 in the one side communication station 10 when the reference timer 11 in the communication station 10 is taken as a reference can be obtained in conformity with the following formula (10) in the case where the signal delay times t1, t4, t2 and t3 are supposed to be zero.

$$\Delta Tb=-\Delta T=(Ta-Tb)/2 \quad (10)$$

When the processing for the adjustment of the reference timer in the communication station 20 to the reference timer in the communication station 10 based on the timer discrepancy quantity $\Delta Tb$ is performed and the measurement phase differences are indicated by $\tau a$ (communication station 10), $\tau b$ (communication station 20), the measurement phase differences $\tau a$, $\tau b$ are expressed by the following formulae (11)–(13).

$$\tau a=Ta+\Delta Tb=T \quad (11)$$

$$\tau b=Tb-\Delta Tb=T \quad (12)$$

$$R=c\times T=c\times\tau a=c\times\tau b \quad (13)$$

Because the aforesaid processing is to turn back the other side reference timer 21 by the time difference $\Delta T$ by the correction of the gains of the reference timer 21, the communication station 20 newly detects a value obtained by the addition of the time difference $\Delta T$ to the value Tb that has been detected as the reception timing until that time. The value is the $\tau b$ in the formula (12).

Until that time, the communication station 20 has transmitted signals at the initial phase when the reference timer 11 in the communication station 10 is $-\Delta T$. However, because the other side reference timer 21 was corrected, the signals are transmitted with a retardation of that period of time. Consequently, a value obtained by the subtraction of the time difference $\Delta T$ from the value Ta that has been detected as the reception timing of the communication station 10 until that time is newly detected. The newly detected value is the $\tau a$ in the formula (11).

As it is known from the formulae (11)–(13), if the reference timers 11, 21 are once set at the same time between the communication station 10 and the communication station 20, the notification from awn opponent station is hereafter unnecessary, and the relative distance R can be detected only by the measurement of the reception timing of a transmission signal from the opponent station.

Because the signal delay times t1, t4, t2 and t3 are actually not zero, when the Ta, Tb on the right side of the formula (10) are replaced by Tah, Tbh and formulae (4), (5) are substituted, the following formula (14) is obtained. Moreover, if the formulae (2), (3) are substituted, the following formula (15) can be obtained.

$$(Tbh-Tah)/2=\{Tb-Ta-(t2+t3-t1-t4)\}/2 \quad (14)$$

$$\Delta Th=(Tbh-Tah)/2=\Delta T+t1-t3 \quad (15)$$

If the quantity $\Delta$Tbh of correction of the reference timer 21 in the communication station 20 is supposed to be $-\Delta$Th in the case where the reference timer 21 in the communication station 20 is adjusted on the basis of the reference timer 11 in the communication station 10, the detection phase difference τa in the communication station 10 and the detection phase difference τb in the communication station 20 after the adjustment of the reference timer 21 are expressed by the following formulae (16), (17).

$$\tau a = Ta + \Delta Tbh \quad (16)$$

$$\tau b = Tb - \Delta Tbh \quad (17)$$

Because the gains of the reference timer 21 is corrected to turn back the timer 21 by $\Delta$Th similarly to the description about the formulae (11)–(13), the communication station 20 detects a new value obtained by the addition of the $\Delta$Th to the value Tb that has been detected as the reception timing until that time. The new value is the τb in the formula (17). Because the timer 21 was corrected although the communication station 20 transmitted a signal when the time of the communication station 10 was $-\Delta$Th until that time, the signals is transmitted with the retardation of that period of time. Consequently, a value obtained by the subtraction of the $\Delta$Th from the value Ta that has been detected as the reception timing of the communication station 10 until that time is newly detected. The value is the τa in the formula (16).

When the formula (2) and (15) are substituted into the formula (16), the following formula (18) is obtained. Moreover, when the formula (3) and (15) are substituted in to the formula (17), the following formula (19) is obtained.

$$\tau a = T + t1 + t4 \quad (18)$$

$$\tau b = T + t2 + t3 \quad (19)$$

If corrected phase differences obtained by the correction of the τa, τb in conformity with the aforesaid correction formulae (4), (5) are designated by τah, τbh, the phase differences τah, τbh is expressed by the following formula (20) to be equal to the propagation time T of the propagation signal.

$$T = \tau ah = \tau bh \quad (20)$$

The following formula (21) obtained by the multiplication of the light velocity "c" to both the sides of the formula (20) is nothing else but the formula (13) in which the τa, τb are replaced by the τah, τbh.

$$R = c \times T = c \times \tau ah = c \times \tau bh \quad (21)$$

As apparent from the aforesaid, when a sum value of the signal delay times t1, t4, t2 and t3 of the transmission system circuits 13, 25 and the reception system circuits 15, 22 of the communication stations 10, 20 is measured and a value obtained by the correction of the detected phase differences Ta, Tb by the formulae (4), (5) is determined as the correction phase difference Tah+Tbh, then the relative distance R between the communication station 10 and the communication station 20 can be detected.

In particular, as described in the explanation concerning the formulae (14)–(21), although respective values of the time differences $\Delta$T of the reference timers 11, 21, and the signal delay times t1, t2, t3 and t4 of the transmission and reception system circuits 13, 15, 22 and 25 cannot be obtained, the relative distance R can be detected by the use of only the phase difference information measured in the self station after the adjustment of the reference timers 11, 21 of the communication station 10 and the communication station 20.

Incidentally, in the case where the reference timer 11 of the communication station 10 is adjusted on the basis of the reference timer 21 of the communication station 20, the adjustment may be performed by the inversion of the sign of the correction quantity of the timer 21.

Moreover, after the determination of the correction quantity $\Delta$Tbh of the reference timer 21 in the communication station 20, the relative distance R between the communication station 10 and the communication station 20 can be obtained in conformity with the formula (22).

$$R = c \times (Tah - \Delta Tbh) \quad (22)$$

As described above, in the distance detection apparatus according to the embodiment 1, the sum value of the delay times t1, t4 and the sum value of the delay times t2, t3 of the transmission. system circuits 13, 25 and the reception system circuits 15, 22 of the communication stations 10, 20 are measured, and the sums of the signal delay times are used as the correction values when the relative distance R is obtained. Consequently, the signal delay times of the signal transmission system circuits 13, 25 and the signal delay times of the reception system circuits 15, 22 are canceled, and thereby high accuracy distance detection becomes possible.

(Embodiment 2)

The aforesaid distance detection apparatus according to the embodiment 1 can be applied to an apparatus that needs distance information such as a position cognition apparatus, a speed detection apparatus, an on-vehicle apparatus, a mobile, a fixed station and a traffic information generation apparatus.

For example, a system in which a transmission signal transmitted by a radio apparatus of a car is reflected by the body of an opponent car and the reflection wave is received will be considered. It is supposed that the communication station 10 in FIG. 1 is a radio apparatus of a self car and the communication station 20 is a radio apparatus of an opponent car. Then, the signal delay times t2, t3 of the reception system circuit 22 and the transmission system circuit 25 of the opponent car are zero, and the state is equivalent to the case where the time differences $\Delta$T of the reference timers 11, 21 are zero. However, there is no information of the correction phase difference Tbh from the radio apparatus of the opponent car. In this case, the distance R can be detected in conformity with the formula (21).

$$R = c \times \{Ta - (t1 + t4)\}/2 \quad (23)$$

where Ta designates a phase difference between the reception signal and the transmission signal when the transmission signal from the radio apparatus of the self car is reflected on the body of the opponent car and the self car receives the reflection wave, i.e. the reception signal.

(Embodiment 3)

Another system in which a signal transmitted by the radio apparatus of a self car is received by the radio apparatus of an opponent car and the radio apparatus of the opponent car ideally transmits a response signal at a zero response time and further the self car receives the response signal will be considered. When the radio apparatus of the opponent car informs the signal delay times t2+t3 of the reception system circuit 22 and the transmission system circuit 25 to the radio apparatus of the self car, the distance R can be calculated in conformity with the formula (24). In this case also, there is no information of the correction phase difference Tbh from the radio apparatus of the opponent car.

$$R=c\times\{Ta-(t1+t4)+(t2+t3)\}/2 \quad (24)$$

Because it is actually impossible to make the response time zero, there is used as a measure against the problem a way in which the opponent car informs the reception time T1 when the opponent car received the transmission signal from the radio apparatus of the self car and the transmission time T2 when the radio apparatus of the opponent car transmitted a transmission signal to the radio apparatus of the self car. In this case also, because the radio apparatus of the opponent car informs the signal delay time t2+t3 to the self car, the distance R can be calculated.

(Embodiment 4)

Although the present invention can be applied to general radio communications systems, in the case where the invention is particularly applied to the spectrum spreading communication mode, an implemented distance detection apparatus has excellent distance resolution, the synchronization adjustment of the spreading code of a reception signal is equivalent to the measurement of the phase difference of the signal as it is. Consequently, it is easy to make the present invention practicable in conformity with the spectrum spreading communication method.

Hereinafter, the accuracy of distance detection and the specifications of radio communication will be described in the following including an embodiment.

The distance R can be measured by the measurement of the propagation time T of an electromagnetic wave on one way by performing an exchange of the electromagnetic wave between a measurement instrument and a measurement object, and by the multiplication of the light velocity ($c=3.0\times10^8$ [m/s]) to the propagation time T. In this case, a distance dx calculated by the multiplication of the light velocity "c" to the time resolution dT of the propagation time T is the distance resolution. On the contrary, the dT calculated by the division of the allowable error of distance dx by the light velocity is the allowable error of time.

When the application of the present invention to a car collision prevention apparatus is considered, the communication stations 10, 20 shown in FIG. 1 are radio communication stations for distance detection to be mounted on cars.

Now, if it is supposed that the allowable distance error in the measurement of the distance between a car and the one in front for the prevention of collision is the order of one meter, the allowable. error dT of measuring time is the order of about three nanoseconds. When a spectrum spreading signal is used as the distance measurement signal, the order of a chip rate for the obtainment of time resolution corresponding to the distance resolution of the order of one metering is about 100 MHz. A spectrum spreading apparatus having a chip rate of the order of 100 MHz can easily be realized. In this case, because the gate delay time of the transmission and reception system circuits of a communication apparatus is generally in an order of several tens or hundreds nanoseconds, gate delay errors cannot be neglected. Even if the gate delay time is corrected to be calculated as a designed value, the gate delay time scarcely accords with the designed value because there is dispersion in the manufacture thereof.

Accordingly, if the distance detection method of the present invention is applied, because the distance detection method of the invention turns back transmission signals of self stations at signal lines 18, 28 to input them into the reception system circuits 15, 22 and thereby phase differences between the transmission signals and the reception signals, which a:e received transmission signals, the gate delay errors including the dispersion in the manufacture can be measured in resolution of about three nanoseconds.

Consequently, by the use of the distance detection method of the present invention, the measurement of the distance between a car and the one in front can be enabled in distance resolution of the order of one meter, and it becomes possible to realize a collision prevention apparatus at a level of practical use.

(Embodiment 5)

As another embodiment, a position detection apparatus such as a locator and a navigator in a cellular mobile telephone system can be realized. For example, the present invention can be applied to emergency service systems such as a police call system or a fire call system, or to a Search for a stray child.

Incidentally, in the United States, an entrepreneur of a mobile telephone business has an obligation of the detection of subscribers at a fixed accuracy and a fixed probability.

In the cellular mobile telephone system, one of the communication station 10 and the communication station 20 shown in FIG. 1 performs a role of a base station, and the other of the communication stations 10, 20 performs a role of a mobile station.

If the accuracy of a cellular mobile telephone necessary for detecting a position is about the order of 60 m, the distance resolution of 60 m is converted into the time resolution of about 200 nanoseconds. It is converted into the frequency resolution about 5 MHz. As a current cellular CDMA system, IS 95 is made practicable, and the chip rate thereof is about 1.2 MHz. Accordingly, if over-sampling of about four times is performed, the time resolution of the order of about 200 nanoseconds can be realized. That is, telephone calls and distance detection can simultaneously be realized in the radio specifications of the order in the same degree of the radio specifications of the spread spectrum communication in conformity with IS 95.

(Embodiment 6)

Embodiment 6 of the present invention performs the distance detection and the distance display service between mobile telephones.

In the embodiment 6, the communication stations 10, 20 shown in FIG. 1 severally perform roles of mobile telephones, and telephone calls are executed between the two mobile telephones.

The order of the distance resolution thereof and the order of the chip rate of spectrum spreading thereof are almost the same as those of the position detection apparatus such as the locator and the navigator of the cellular mobile telephone system of the aforesaid embodiment 5.

(Embodiment 7)

Figure 2:
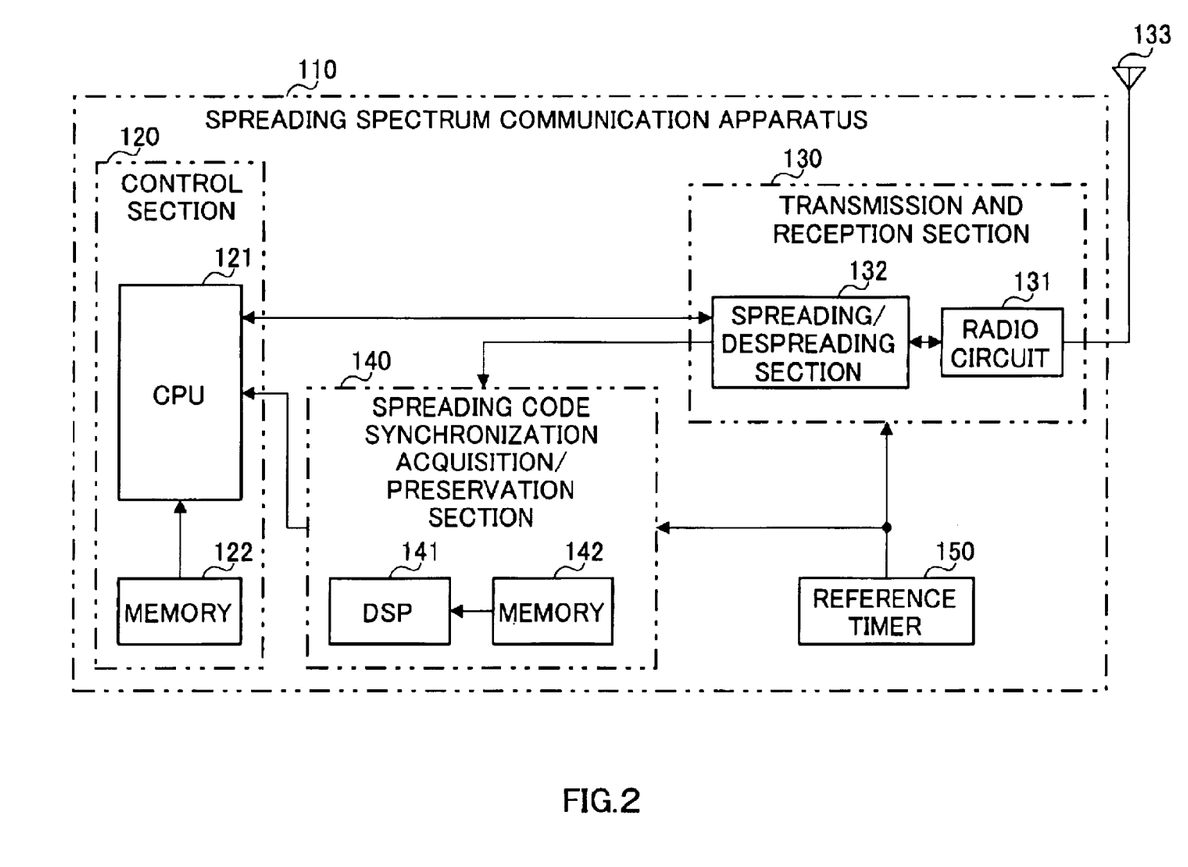
FIG. 2 is a block diagram showing the configuration of the distance detection apparatus according to embodiment 7 of the present invention.

FIG. 2 is a block diagram showing the basic configuration of a general communication apparatus in conformity with the spectrum spreading communication mode according to embodiment 7 of the present invention.

As shown in the figure, the communication apparatus is configured so as to comprise a control section 120 including a CPU 121 for control and a memory 122, a transmission and reception section 130 including a radio circuit 131, a spreading/despreading section 132 and an antenna 133 for both of transmitting and receiving, a spreading code synchronization acquisition/preservation section 140 including a digital signal processor (DSP) 141 and a memory 142, and a reference timer 150.

Because the antenna 133 for both of transmitting and receiving is connected with both of a transmission system circuit and a reception system circuit, a transmission, signal is turned back at the antenna section to be input to the reception system circuit as it is.

In the spectrum spreading communication, that a transmission signal of self station is recognized as a reception signal from the opponent station is prevented in conformity with the FDD system that utilizes different carrier frequencies as the carrier frequency of a transmission wave and the carrier frequency of a reception wave or the TDD system that separates the transmission timing and the reception timing and neglects reception signals during the transmission timing.

If a transmission signal of a self station is received by the self station, it can be realized by the TDD system unless the reception signal during the transmission timing is neglected. If the carrier of the transmission wave is supplied as a demodulation wave of the demodulation circuit of signal reception, that can be realized in the FDD system.

Moreover, in the spectrum spreading communication, because the synchronization acquisition and preservation by the spreading code synchronization acquisition/preservation section 140 is the measurement of the reception timing as it is, it is not necessary to add new hardware for the measurement of the reception timing to the current hardware configuration for performing the measurement of the reception timing of a turned back transmission signal from self station and a signal from an opponent station.

Figure 3:
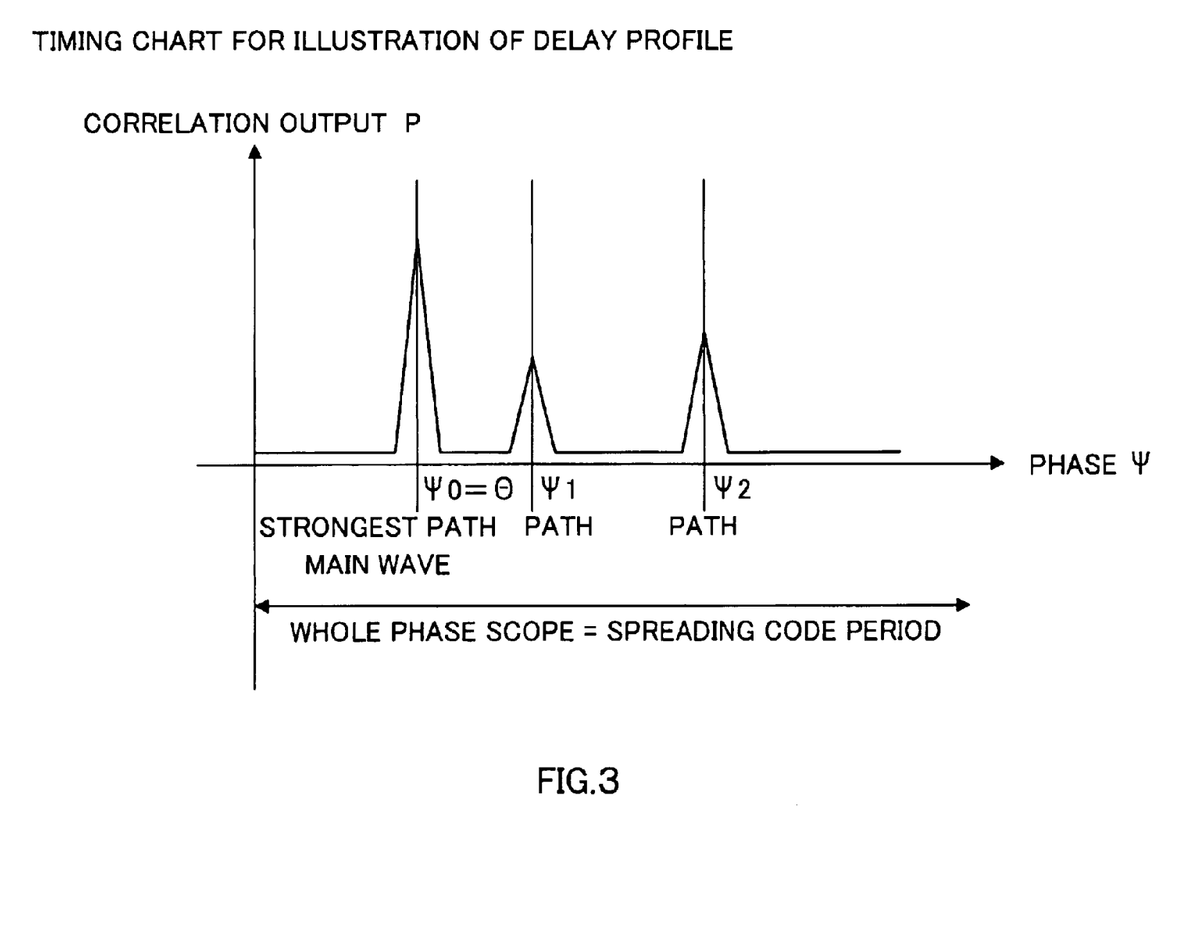
FIG. 3 is a timing chart for illustrating a delay profile of the distance detection apparatus according to embodiment 8.

As an example of the spreading code synchronization acquisition/preservation section 140, the illustration of a delay profile is shown in FIG. 3. In the figure, correlation outputs are detected in the whole phase scope, and a phase $\psi i$ at which the correlation output larger enough than noises is output is obtained, and then the despreading is performed at the phase $\psi i$ in ordinary demodulation.

In case of the detection of the distance between a car and the one in front, the time resolution when four times over-sampling at the chip rate of 100 MHz is performed is about 2.5 nanoseconds, and it is converted to about 0.75 m of distance resolution.

Because the chip rate is 1.2 MHz in the CDMA system IS 95 that is actually applied as a cellular standard mobile telephone system, the time resolution at the time of the four times over-sampling is about 200 nanoseconds, and is converted to be about 60 m distance resolution.

As apparent from the aforesaid, the hardware configuration of a current general spectrum spreading communication apparatus meets the necessary conditions of the hardware configuration of a distance measurement apparatus of the present invention. Accordingly the distance detection apparatus of the present invention can easily be realized by storing a program realizing the method for detecting distance of the present invention into the memory 122 of the control means 120 in a current general spectrum spreading communication apparatus used as it is.

(Embodiment 8)

Although a spectrum spreading communication apparatus is described as an example in the aforesaid embodiment 7, it is apparent that the present invention can be applied to the whole radio communication system. That is, it is realized only by the addition of reception timing measuring means capable of measuring at the time resolution converted from the required distance resolution to the hardware configuration of a communication apparatus.

This application is based on the Japanese Patent Application No. HEI 11-210237 filed on Jul. 26, 1999, entire content of which is expressly incorporated by reference herein.

Industrial Applicability

According to the present invention, in the distance measurement among communication stations performing various communications, especially the communication in conformity with the spectrum spreading communication mode, high accuracy distance detection can be performed.

What is claimed is:

1. A distance detection apparatus, comprising:

a wireless transmission system circuit that transmits a transmission signal after performing signal processing of the transmission signal;

a wireless reception system circuit that performs signal processing of a reception signal received from an object subjected to a distance measurement;

a distance detection section that measures a signal delay time in said wireless transmission system circuit and said wireless reception system circuit, and corrects a distance measurement value, that is obtained by measuring a distance to the object, using a signal delay time;

a first reference timer that generates a first reference timing;

a signal generation section that generates a periodic signal synchronized with the first reference timing to input the periodic signal to said wireless transmission system circuit as the transmission signal, wherein said distance detection section detects a first phase difference indicating a degree of a discrepancy of reception timing of the reception signal received from the object from the first reference timing, and detects the distance to the object using the first phase difference, the detected signal delay time, a second phase difference and a signal delay time being detected at the object, said distance detection section correcting the first phase difference using the detected signal delay time to obtain a corrected phase difference, the distance to the object being detected using the corrected phase difference and an informed corrected phase difference informed by the object, said distance detection section obtaining the corrected phase difference in conformity with a formula:

(corrected phase difference)=(first phase difference)−(detected signal delay time).

2. The distance detection apparatus of claim 1, wherein said distance detection section detects tire distance to the object in conformity with a following formula;

(distance)=$K$×((corrected phase difference)+(informed corrected phase difference))/2 where K is a constant corresponding to the velocity of light.

3. A distance detection apparatus, comprising:

a wireless transmission system circuit that transmits a transmission signal after performing signal processing of the transmission signal;

a wireless reception system circuit that performs signal processing of a reception signal received from an object subjected to a distance measurement;

a distance detection section that measures a signal delay time in said wireless transmission system circuit and said wireless reception system circuit, and corrects a distance measurement value, that is obtained by measuring a distance to the object, using a signal delay time;

a first reference timer that generates a first reference timing;

a signal generation section that generates a periodic signal synchronized with the first reference timing to input the periodic signal to said wireless transmission system as the transmission signal, wherein said distance detection section detects a first phase difference indicating a degree of a discrepancy of reception timing of the reception signal received from the object from the first reference timing, and detects the distance to the object using the first phase difference, the detected signal delay time, a second phase difference and a signal delay time being detected at the object, said distance detection section correcting the first phase difference using the detected signal delay time to obtain a corrected phase difference, the distance to the object being detected using the corrected phase difference and an informed corrected phase difference informed by the object, a communication station having a second reference timer that generates a second reference timing, the signal delay time being measured at the object, a second phase difference indicating a degree of a discrepancy of the reception timing of the reception signal from the second reference timing being detected, the second phase difference being corrected using the signal delay time at the object, the corrected phase difference being transmitted as the informed corrected phase difference, said distance detection section determining a correction quantity for an adjustment of the first reference timer and the second reference timer using the corrected phase difference and the informed corrected phase difference, said distance detection section determining a correction quantity of the second reference timer on a basis of the first reference timer in conformity with a formula;

(correction quantity of second reference timer)=((corrected phase difference)−(informed corrected phase difference))/2.

4. A distance detection apparatus, comprising:

a wireless transmission system circuit that transmits a transmission signal after performing signal processing of the transmission signal;

a wireless reception system circuit that performs signal processing of a reception signal received from an object subjected to a distance measurement;

a distance detection section that measures a signal delay time in said wireless transmission system circuit and said wireless reception system circuit, and corrects a distance measurement value, that is obtained by measuring a distance to the object, using a signal delay time;

a first reference timer that generates a first reference timing;

a signal generation section that generates a periodic signal synchronized with the first reference timing to input the periodic signal to said wireless transmission system circuit as the transmission signal, wherein said distance detection section detects a first phase difference indicating a degree of a discrepancy of reception timing of the reception signal received from the object from the first reference timing, and detects the distance to the object using the first phase difference, the detected signal delay time, a second phase difference and a signal delay time being detected at the object, said distance detection section correcting the first phase difference using the detected signal delay time to obtain a corrected phase difference, the distance to the object being detected using the corrected phase difference and an informed corrected phase difference informed by the object, a communication station having a second reference timer that generates a second reference timing, the signal delay time being measured at the object, a second phase difference indicating a degree of a discrepancy of the reception timing of the reception signal from the second reference timing being detected, the second phase difference being corrected using the signal delay time at the object, the corrected phase difference being transmitted as the informed corrected phase difference, said distance detection section determining a correction quantity for an adjustment of the first reference timer and the second reference timer using the corrected phase difference and the informed corrected phase difference, said distance detection section determining a correction quantity of the first reference timer on a basis of the second reference timer in conformity with a formula;

(correction quantity of first reference timer)=((informed corrected phase difference)−(corrected phase difference))/2.

5. A distance detection apparatus, comprising:

a wireless transmission system circuit that transmits a transmission signal after performing signal processing of the transmission signal;

a wireless reception system circuit that performs signal processing of a reception signal received from an object subjected to a distance measurement;

a distance detection section that measures a signal delay time in said wireless transmission system circuit and said wireless reception system circuit, and corrects a distance measurement value, that is obtained by measuring a distance to the object, using a signal delay time;

a first reference timer that generates a first reference timing;

a signal generation section that generates a periodic signal synchronized with the first reference timing to input the periodic signal to said wireless transmission system circuit as the transmission signal, wherein said distance detection section detects a first phase difference indicating a degree of a discrepancy of reception timing of the reception signal received from the object from the first reference timing, and detects the distance to the object using the first phase difference, the detected signal delay time, a second phase difference and a signal delay time being detected at the object, said distance detection section correcting the first phase difference using the detected signal delay time to obtain a corrected phase difference, the distance to the object being detected using the corrected phase difference and an informed corrected phase difference informed by the object, a communication station having a second reference timer that generates a second reference timing, the signal delay time being measured at the object, a second phase difference indicating a degree of a discrepancy of the reception timing of the reception signal from the second reference timing being detected, the second phase difference being corrected using the signal delay time at the object, the corrected phase difference being transmitted as the informed corrected phase difference, said distance detection section determining a correction quantity for an adjustment of the first reference timer and the second reference timer using the corrected phase difference and the informed corrected phase difference, said distance detection section detecting the distance to the object in conformity with a formula after said distance detection section performs the adjustment of the first reference timer and the second reference timer;

(distance)=$K$×(corrected phase difference), where K is a constant corresponding to the velocity of light.

6. A distance detection apparatus, comprising:
   a wireless transmission system circuit that transmits a transmission signal after performing signal processing of the transmission signal;
   a wireless reception system circuit that performs signal processing of a reception signal received from an object subjected to a distance measurement;
   a distance detection section that measures a signal delay time in said wireless transmission system circuit and said wireless reception system circuit, and corrects a distance measurement value, that is obtained by measuring a distance to the object, using a signal delay time;
   a first reference timer that generates a first reference timing;
   a signal generation section that generates a periodic signal synchronized with the first reference timing to input the periodic signal to said wireless transmission system circuit as the transmission signal, wherein said distance detection section detects a first phase difference indicating a degree of a discrepancy of reception timing of the reception signal received from the object from the first reference timing and detects the distance to the object using the first phase difference, the detected signal delay time, a second phase difference and a signal delay time being detected at the object, said distance detection section correcting the first phase difference using the detected signal delay time to obtain a corrected phase difference, the distance to the object being detected using the corrected phase difference and an informed corrected phase difference informed by the object, a communication station having a second reference timer that generates a second reference timing, the signal delay time being measured at the object, a second phase difference indicating a degree of a discrepancy of the reception timing of the reception signal from the second reference timing being detected, the second phase difference being corrected using the signal delay time at the object, the corrected phase difference being transmitted as the informed corrected phase difference, said distance detection section determining a correction quantity for an adjustment of the first reference timer and the second reference timer using the corrected phase difference and the informed corrected phase difference, said distance detection section detecting the distance to the object in conformity with a following formula after said distance detection section determines the correction quantity of the second reference timer;

(distance)=$K$×((corrected phase difference)−(correction quantity of second reference timer)), where K is a constant corresponding to the velocity of light.

7. A distance detection apparatus, comprising:
   a wireless transmission system circuit that transmits a transmission signal after performing signal processing of the transmission signal;
   a wireless reception system circuit that performs signal processing of a reception signal received from an object subjected to a distance measurement;
   a distance detection section that measures a signal delay time in said wireless transmission system circuit and said wireless reception system circuit, and corrects a distance measurement value, that is obtained by measuring a distance to the object, using a signal delay time;
   a first reference timer that generates a first reference timing; and
   a signal generation section that generates a periodic signal synchronized with the first reference timing to input the periodic signal to said wireless transmission system circuit as the transmission signal, wherein
   said distance detection section detects a first phase difference indicating a degree of a discrepancy of reception timing of a reflection wave of the transmission signal reflected by the object from the first reference timing, and detects the distance to the object in conformity with a following formula;

(distance)=$K$×((first phase difference)−(detected signal delay time))/2, where K is a constant corresponding to the velocity of light.

* * * * *

UNITED STATES PATENT AND TRADEMARK OFFICE
CERTIFICATE OF CORRECTION

PATENT NO.    : 6,820,031 B1
DATED         : November 16, 2004
INVENTOR(S)   : T. Hayakawa It is certified that error appears in the above-identified patent and that said Letters Patent is hereby corrected as shown below:

Column 12,
Line 57, ";" should be -- : --.

Column 13,
Line 14, after "system" insert -- circuit --.
Line 58, after "corrects" insert -- a --.

Column 14,
Line 30, ";" should be -- : --.

Column 15,
Line 45, after "timing" insert -- , --.

Column 16,
Lines 16 and 46, ";" should be -- : --.

Signed and Sealed this

Twenty-seventh Day of December, 2005

JON W. DUDAS
*Director of the United States Patent and Trademark Office*